United States Patent [19]
Kono et al.

[11] Patent Number: 6,019,908
[45] Date of Patent: Feb. 1, 2000

[54] ION-CONDUCTIVE POLYMER ELECTROLYTE

[75] Inventors: Michiyuki Kono, Neyagawa; Kenji Motogami, Takatsuki; Shigeo Mori, Kyoto, all of Japan

[73] Assignee: Dai-Ichi Kogyo Seiyaku, Co., Ltd., Kyoto, Japan

[21] Appl. No.: 07/998,021

[22] Filed: Dec. 29, 1992

[30] Foreign Application Priority Data

Jan. 24, 1992 [JP] Japan ................................ 4-034368

[51] Int. Cl.⁷ ................................ H01M 6/18; H01G 4/18
[52] U.S. Cl. ........................ 252/62.2; 429/304; 429/306; 429/307; 429/317; 429/310; 429/311; 429/314
[58] Field of Search .................... 252/62.2; 429/304, 429/306, 307, 310, 311, 314

[56] References Cited

U.S. PATENT DOCUMENTS

| | | | |
|---|---|---|---|
| 5,098,589 | 3/1992 | Motogami et al. | 252/62.2 |
| 5,116,541 | 5/1992 | Motogami | 252/519.21 |
| 5,139,001 | 8/1992 | Motogami et al. | 524/157 |
| 5,268,243 | 12/1993 | Noda et al. | 429/317 |
| 5,356,553 | 10/1994 | Kono et al. | 252/62.2 |
| 5,433,877 | 7/1995 | Kono et al. | 252/62.2 |
| 5,436,090 | 7/1995 | Kono et al. | 429/317 |
| 5,527,639 | 6/1996 | Noda et al. | 429/311 |
| 5,755,985 | 5/1998 | Vallee et al. | 252/62.2 |

FOREIGN PATENT DOCUMENTS

| | | |
|---|---|---|
| 425255 A2 | 5/1991 | European Pat. Off. . |
| 83249 | of 1986 | Japan . |
| 249361 | of 1987 | Japan . |
| 200863 | of 1991 | Japan . |

Primary Examiner—Alan Diamond
Attorney, Agent, or Firm—Morgan & Finnegan, L.L.P.

[57] ABSTRACT

An ion-conductive polymer electrolyte comprises an organic polymer, a soluble electrolyte salt and an organic solvent. The organic polymer is a compound obtained by crosslinking an organic compound having an average molecular weight of 500 to 50,000 and a structure of the following general formula ①,

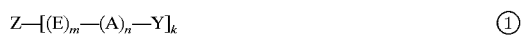

in which Z is a residue of a compound having at least one active hydrogen; Y is an active hydrogen group or polymerizable functional group; k is an integer of 1 to 12; E is a structure of the following general formula ②,

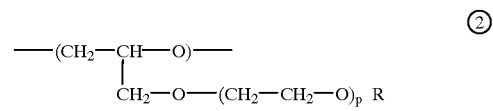

wherein p is an integer of 0 to 25 and R is an alkyl, alkenyl, aryl or alkylaryl group having 1 to 20 carbon atoms; A is $-(CH_2-CH_2-O)-$; m is an integer of 1 to 220; n is an integer of 1 to 240 and $m+n \geq 4$; and E and A are random-copolymerized. The organic solvent is at least one selected from the group consisting of tetrahydrofuran, 2-methyltetrahydrofuran, 1,3-dioxolan, 4,4-dimethyl-1,3-dioxolan, γ-butyrolactone, ethylene carbonate, propylene carbonate, butylene carbonate, sulfolan, 3-methylsulfone, tert-butyl ether, iso-butyl ether, 1,2-dimethoxyethane, 1,2-ethoxymethoxyethane and ethylene glycol diethyl ether.

6 Claims, No Drawings

ION-CONDUCTIVE POLYMER ELECTROLYTE

BACKGROUND OF THE INVENTION

This invention relates to an ion-conductive polymer electrolyte.

As an ion-conductive polymer electrolyte, there has been known following compounds. For example, an organic polymer electrolyte of polyethylene oxide (PEO) type; an organic polymer electrolyte having a multifunctional polyether molecular structure prepared by a random copolymerization of ethylene oxide portion and propylene oxide portion (Japanese Laid-Open Patent Publication No. 249,361 of 1987); a solid polymer electrolyte comprising an ethylene oxide copolymer containing an ionic compound in dissolved state (Japanese Laid-Open Patent Publication No. 83,249 of 1986); and an ion-conductive polymer electrolyte in which a high polymer solid substance having plasticity is further constituted substantially with a branched-chain of a homopolymer or copolymer which is thermoplastic and has no crosslinkage (Japanese Laid-Open Patent Publication No. 98,480 of 1980).

However, those conventional ion-conductive polymer electrolytes have the following problems.

First, the organic polymer electrolyte of polyethylene oxide type shows a relatively good lithium-ion conductivity in the temperature range of not lower than 40° C., but the characteristic is lowered rapidly at the room temperature range of about 25° C. Accordingly, it is difficult to use the electrolyte for various electric applications.

The organic polymer electrolytes described in Japanese Laid-Open Patent Publication No. 249,361 of 1987 do not show rapid lowering of the lithium-ion conductivity at the room temperature range of about 25° C., but the lowering proceeds at a temperature of not higher than 0° C. which is considered as a practical temperature range. Therefore, a practical ion-conductivity cannot be obtained.

The organic polymer electrolyte described in Japanese Laid-Open Patent Publication No. 83,249 of 1986 is an organic polymer prepared by a random-copolymerization of ethylene oxide with another monomer. The structure of the resulting organic polymer is amorphous as a result of random-copolymerization, but the product quality tends to be unstable since the structure of the organic polymer does not become amorphous sufficiently.

Further, since the organic polymer electrolyte described in Japanese Laid-Open Patent Publication No. 98,480 of 1980 is thermoplastic, a film formed with it is limited only to be simple and a good adhesion of the film to the electrode cannot be obtained.

We, inventors, have earnestly studied ion-conductive polymer electrolytes to solve these problems, and have found that the ion-conductivity can be improved in ion-conductive polymer electrolytes comprising an organic polymer having a specific structure together with a soluble electrolyte salt as shown in Japanese Laid-Open Patent Publications No. 200863 of 1991, No. 200864 of 1991 and No. 200865 of 1991.

Each of the ion-conductive polymer electrolytes disclosed in those Japanese Laid-Open Patent Publications shows an ion-conductivity superior to the aforementioned electrolytes, but the ion-conductivity is gradually lowered with lowering the temperature. Accordingly those electrolytes do not have a satisfactory stability at a low temperature such as −20° C.

The object of the present invention is to solve such problems as described above and to provide an ion-conductive polymer electrolyte which shows an excellent and stable ion conductivity at low temperature such as −20° C. and can be easily handled.

SUMMARY OF THE INVENTION

The ion-conductive polymer electrolyte according to the present invention comprises an organic polymer, a soluble electrolyte salt and an organic solvent. The organic polymer is obtained by crosslinking an organic compound having an average molecular weight of 500 to 50,000 and a compound of the following general formula ①;

in which Z is a residue of a compound having at least one active hydrogen; Y is an active hydrogen group or polymerizable functional group; k is an integer of 1 to 12, E is a compound of the following general formula ②,

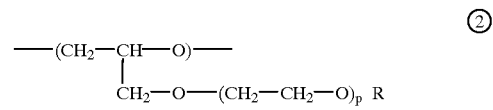

wherein p is an integer of 0 to 25 and R is an alkyl, alkenyl, aryl or alkylaryl group having 1 to 20 carbon atoms; A is $-(CH_2-CH_2-O)-$; m is an integer of 1 to 220; n is an integer of 1 to 240 and $m+n \geq 4$; and E and A are random-copolymerized. The organic solvent is at least one selected from the group consisting of tetrahydrofuran, 2-methyltetrahydrofuran, 1,3-dioxolan, 4,4-dimethyl-1,3-dioxolan, γ-butyrolactone, ethylene carbonate, prolylene carbonate, butylene carbonate, sulfolan, 3-methylsulfone, tert-butyl ether, iso-butyl ether, 1,2-dimethoxyethane, 1,2-ethoxymethoxyethane and ethylene glycol diethyl ether.

The organic polymer may be obtained by crosslinking the compound having a structure of the formula ① either with or without a crosslinking agent.

DETAILED DESCRIPTION OF THE INVENTION

The organic compound having a structure of the general formula ① which is used as a material for the organic polymer can be obtained by the method in which an active hydrogen compound is reacted with glycidyl ethers solely or together with ethylene oxides to obtain a polyether compound and then, if necessary, the polyether compound is reacted with a compound having a polymerizable functional group to introduce the polymerizable functional group to the end active hydrogen of the main chain of said ethylene oxides. Generally, the average molecular weight of the organic compound is not more than 50,000 preferably.

When the above polymerizable functional group is introduced or a crosslinking agent is reacted as described below, the above glycidyl ethers are reacted with ethylene oxide and then ethylene oxide is further partially added to the molecular terminal.

As for the active hydrogen compounds, there are exemplified the following compounds; such as polyhydric alcohols, e.g., methanol, ethanol, ethylene glycol, propylene glycol, 1,4-butanediol, glycerol, trimethylolpropane, sorbitol, sucrose, polyglycerol and the like; amine compounds, e.g., butylamine, 2-ethyl hexylamine, ethylenediamine, hexamethylenediamine, diethylenetriamine, triethylenetetramine, tetraethylenepentamine, pentaethylenehexamine, aniline, benzylamine, phenylenediamine and the like; phenolic active hydrogen compounds, e.g., Bisphenol A, hydroquinone, novolak and the like; the compound having foreign active hydrogen groups in one molecule, e.g., monoethanolamine, diethanolamine and the like. Among them, polyhydric alcohols are particularly preferred.

Next, as the glycidyl ethers to be reacted with the active hydrogen compounds, there are exemplified the following compounds; such as alkyl-, alkenyl-, aryl- or alkylaryl-polyethylene glycol glycidyl ethers represented by the following formula;

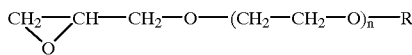

wherein n is an integer of 0 to 25, R is an alkyl, alkenyl, aryl or alkylaryl group having 1 to 20 carbon atoms. The typical compounds are represented by the above formula in which R is a straight chain alkyl such as methyl, ethyl, butyl and the like; branched alkyl such as isopropyl, sec-butyl, tert-butyl and the like; alkenyl such as vinyl, allyl, 1-propenyl, 1,3-butadienyl and the like; aryl or alkylaryl such as phenyl, nonylphenyl, tolyl, benzyl and the like. Particularly, the compounds represented by the above formula in which n is an integer of 1 to 15 and R has 1 to 12 carbon atoms are preferably used.

As the catalysts which may be used in the reaction, there are generally exemplified basic catalysts such as sodium methylate, sodium hydroxide, potassium hydroxide, lithium carbonate and the like. However, acidic catalysts such as boron trifluoride and the like; amine catalysts such as trimethylamine, triethylamine and the like are also useful. The amount of the catalyst used is arbitrary.

In the organic compound used in the present invention, the addition molar number of glycidyl ethers is preferably 1 to 250 mole per one active hydrogen of the active hydrogen compound and the molar number of ethylene oxides random-copolymerized with glycidyl ethers is preferably 1 to 450 mole per one active hydrogen.

Further, the crosslinking reaction of the organic compounds in which the end group Y of the main chain is an active hydrogen group may be carried out by using a crosslinking agent.

As the crosslinking agents, there are exemplified the following compounds; such as 2,4-tolylene diisocyanate (2,4-TDI), 2,6-tolylene diisocyanate (2,6-TDI), 4,4'-diphenylmethane diisocyanate (MDI), hexamethylene diisocyanate (HMDI), isophorone diisocyanate, triphenylmethane diisocyanate, tris(isocyanatephenyl)thiophosphate, lysine ester triisocyanate, 1,8-diisocyanate-4-isocyanatemethyl octane, 1,6,11-undecane triisocyanate, 1,3,6-hexamethylene triisocyanate, bicycloheptane triisocyanate, buret-bonded HMDI, isocyanurate-bonded HMDI, an adduct of trimethylolpropane with 3 moles of TDI, and the mixture thereof.

When an isocyanate compound is used as the crosslinking agent, it is generally used in such an amount as the number of isocyanate group becomes 1 to 1.5 times of the number of the active hydrogen groups in the end of the main chain of the organic compound.

Further, to complete rapidly the crosslinking reaction, it is preferred to use a catalyst. Among the catalysts, there are included such as organic metal catalysts, e.g., dibutyltin dilaurate (DBTDL), dibutyltin diacetate (DBTA), phenyl mercury salt of propionic acid, lead octenate and the like; amine catalysts, e.g., triethylenediamine, N,N'-dimethylpiperazine, N-methylmorpholine, tetramethyl guanidine, triethylamine and the like.

Furthermore, when the end group Y of the main chain is a polymerizable functional group, the polymerizable functional group is introduced to the end of the main chain of the polyether compound obtained by the reaction of the active hydrogen compound with glycidyl ethers and ethylene oxides. Among the polymerizable functional groups, there are included an alkenyl such as vinyl and the like; an group having an unsaturated bond such as acryloyl, methacryloyl and the like; a group having straight chain and cyclic portion containing Si and the like. These groups are introduced into the molecule by reacting the above polyether compound with a compound having the polymerizable functional group.

As the compounds having the polymerizable functional group, there are exemplified the following compounds; a compound having a carboxyl group and unsaturated bond in one molecule such as acrylic acid, methacrylic acid, cinnamic acid, maleic acid, fumaric acid, itaconic acid, p-vinyl benzoic acid and the like; and/or an anhydride of the above compound such as maleic anhydride, itaconic anhydride and the like; and/or an acid chloride of the above compound; glycidyls such as allyl glycidyl ether, glycidyl methacrylate and the like; isocyanates such as methacryloyl isocyanate and the like; a Si-containing compound such as dichlorosilane, dimethylvinylchlorosilane and the like.

Further, the introduction of a polymerizable functional group to the terminal of the polyether main chain may be carried out by reacting a compound having in the molecule a reactive group to isocyanate group and a polymerizable group such as allyl or acryloyl group, e.g., hydroxyacrylate, hydroxymethacrylate and the like, after reacting with the terminal hydroxy group of the polyether main chain an isocyanate compound having at least two isocyanate such as 2,4-tolylene diisocyanate (2,4-TDI), 4,4'-diphenylmethane diisocyanate (MDI) or the like.

These organic compounds are crosslinked by the polymerization reaction. The polymerization reaction may be carried out under irradiation with an active radiation such as light, heat, electronic ray or the like. If necessary, a polymerization initiator and/or a sensitizer may be used.

Further, as the soluble electrolyte salt doped into the organic compound thus obtained, there are exemplified the following compounds; such as inorganic-ion salts containing at least one metal element selected from the group consisting of Li, Na, K, Cs, Ag, Cu and Mg, e.g., LiI, LiCl, LiClO$_4$, LiSCN, LiBF$_4$, LiAsF$_6$, LiCF$_3$SO$_3$, LiCF$_3$CO$_2$, LiHgI$_3$, NaI, NaSCN, NaBr, KI, CsSCN, AgNO$_3$, CuC$_{12}$Mg (ClO$_4$)$_2$ and the like; quaternary ammonium salts, e.g., (CH$_3$)$_4$NBF$_4$, (CH$_3$)$_4$NBr, (C$_2$H$_5$)$_4$NClO$_4$, (C$_2$H$_5$)$_4$NI, (C$_3$H$_7$)$_4$NBr, (n-C$_4$H$_9$)$_4$ClO$_4$, (n-C$_4$H$_9$)$_4$NI, (n-C$_5$H$_{11}$)$_4$NI and the like; organic-ion salts, e.g., lithium stearylsulfonate, sodium octylsulfonate, lithium dodecylbenzenesulfonate, sodium naphthalenesulfonate, lithium dibutylnaphthalenesulfonate, potassium octylnaphthalenesulfonate, potassium dodecylnaphthalenesulfonate and the like. These soluble electrolyte salts may be used in combination.

The organic solvents added with the soluble electrolyte salt to the organic polymer are to dissolve the above soluble electrolyte salts and include such as tetrahydrofuran, 2-methyltetrahydrofuran, 1,3-dioxolan, 4,4-dimethyl-1,3-dioxolan, γ-butyrolactone, ethylene carbonate, propylene carbonate, butylene carbonate, sulfolan, 3-methylsulfone, tert-butyl ether, iso-butyl ether, 1,2-dimethoxyethane, 1,2-ethoxymethoxyethane, ethylene glycol diethyl ether and mixtures thereof.

The use of the organic solvents contributes to remarkably increase the conductivity without changing the basic structure of the organic polymer.

The amount of the organic solvent used is preferably 100–900% by weight based on the amount of the above organic polymer. The method for addition is not particularly limited. For example, there is a method in which a soluble electrolyte salt is dissolved in the organic solvent and the solution is added to the organic compound in the crosslinking of the organic compound and then the crosslinking reaction is carried out to obtain the ion-conductive polymer electrolyte; and a method in which the organic polymer is impregnated with a solution of a soluble electrolyte salt dissolved in the organic solvent to obtain the ion-conductive polymer, and the like. The organic solvent may be added before or after the crosslinking reaction.

The amount of soluble electrolyte salts used is preferably at least 0.5% by weight based on the amount of the organic solvent and, but not more than the solubility of the soluble electrolyte salts in the organic solvent.

According to the present invention, since an organic polymer electrolyte comprising monomers having the specific structure is used, the structure of the organic polymer is made to be completely amorphous. And, since the organic polymer electrolyte has the side chain as well as the main chain, the crystallization temperature is lowered. Further, when a soluble electrolyte salt such as lithium salt is contained, the movement of the lithium cation becomes easy so that the lithium-ion conductivity in the temperature range of not higher than room temperature is improved. In this manner, an ion-conductive polymer electrolyte excellent in characteristic at low temperature and stable in quality can be obtained. Furthermore, since the organic polymer compound is thermosetting, the product having various forms can be obtained. Further, a film excellent in adhesion with the surface of the electrode can be produced and an ion-conductive polymer electrolyte able to be used in various practical forms can be obtained.

PREFERRED EMBODIMENTS OF THE INVENTION

The following examples serve to illustrate the invention in more detail although the invention is not limited to the examples. Each of m and p values indicated in the following examples is an average value.

EXAMPLE 1

A mixture of 18 g of glycerol, 730 g of methyldiethylene glycol glycidyl ether represented by the following formula

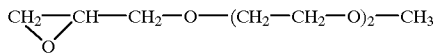

and 182 g of ethylene oxide was reacted in the presence of 2 g of potassium hydroxide as a catalyst, and then the product was purified with desalting to obtain 876 g of a polyether having an average molecular weight of 4,700 (calculated by hydroxide value).

The polyether and 1.1 equivalent weight of acrylic acid to the hydroxide number of the polyether were added to benzene the used amount of which is identical with that of the acrylic acid. The mixture was reacted by adding 0.01 mol % of sulfuric acid at a temperature of 80 to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-acrylated polyether having an average molecular weight of 4,862 and a structure of the formula ①, in which

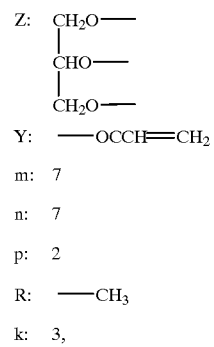

was confirmed by measuring the bromine value and the saponification value.

To 3.6 g of thus obtained terminal-acrylated polyether, 3.6 g of propylene carbonate, 0.4 g of lithium perchlorate and 0.04 g of 1-hydroxycyclohexyl phenyl ketone (polymerization initiator) were added and homogeneously dissolved. The obtainted solution was flowed and spread on a glass plate, and irradiated with ultraviolet ray of 7 mW/cm$^2$ for 2 minutes under an atmosphere of nitrogen gas to obtain an ion-conductive polymer electrolyte having a thickness of 100 $\mu$m.

EXAMPLE 2

A mixture of 20 g of sorbitol, 1,320 g of methyltriethylene glycol glycidyl ether represented by the following formula

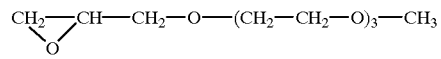

and 30 g of ethylene oxide was reacted in the presence of 2.7 g of potassium hydroxide as a catalyst, and then the product was purified with desalting to obtain 1,251 g of a polyether having an average molecular weight of 12,310 and a structure of the formula ①, in which

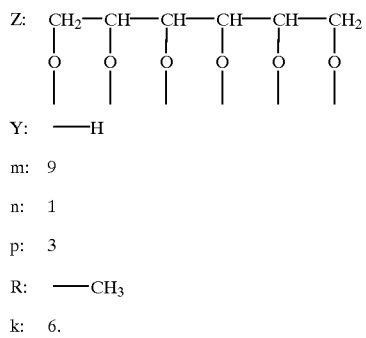

3.6 g of thus obtained polyether, 1.5 equivalent weight of tolylenediisocyanate to the mole number of the polyether and 0.01 g of dibutyltin dilaurate were dissolved in 3 ml of methyl ethyl ketone and then the mixture was poured into a flat vessel. Then the solution was allowed to stand for 30 minutes at 60° C. in a stream of nitrogen gas under atmospheric pressure. Then the solution was heat-treated for 8 hours at 80° C. in vacuum degree of below $1 \times 10^{-3}$ Torr to remove methyl ethyl ketone, and then thus obtained film was impregnated with a solution of lithium tetraborofluoride (3 g) dissolved in propylene carbonate (10 g) under an atmosphere of nitrogen gas to obtain an ion-conductive polymer electrolyte having a thickness of 44 μm.

EXAMPLE 3

A mixture of 15 of glycerol, 180 g of methylhexaethylene glycol glycidyl ether represented by the following formula

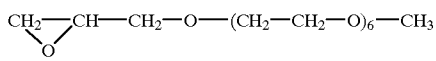

and 1,300 g of ethylene oxide were reacted in the presence of 5 g of potassium hydroxide as a catalyst, and then the product was purified with desalting to obtain 1,210 g of a polyether having an average molecular weight of 8,900 (calculated by hydroxide value).

The polyether and 1.1 equivalent weight of acrylic acid to the hydroxide number of the polyether were added to benzene the used amount of which is identical with that of the acrylic acid. The mixture was reacted by adding 0.01 mol % of sulfuric acid at a temperature of 80 to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-acrylated polyether having an average molecular weight of 9,062 and a structure of the formula ①, in which Z: 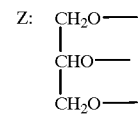

Y: $-OCCH=CH_2$ m: 1 n: 60 p: 6

R: —$CH_3$ k: 3, was confirmed by measuring the bromine value and the saponification value.

To 3.6 g of thus obtained terminal-acrylated polyether, 10 g of propylene carbonate, 1.2 g of lithium perchlorate and 0.04 g of 1-hydroxycyclohexyl phenyl ketone (polymerization initiator) were added and homogeneously dissolved, and then the obtained solution was flowed and spread on a glass plate, and irradiated with ultraviolet ray of 7 mW/cm² for 2 minutes under an atomosphere of nitrogen gas to obtain an ion-conductive polymer electrolyte having a thickness of 100 μm.

EXAMPLE 4

A mixture of 20 g of monoethanolamine, 2,400 g of of phenyldiethylene glycol glycidyl ether represented by the following formula

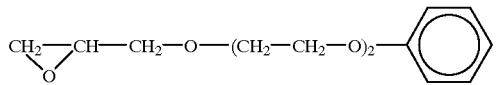

and 1,780 of ethylene oxide was reacted in the presence of 5.8 g of potassium hydroxide as a catalyst, and then the product was purified with desalting to obtain 3,980 g of a polyether having an average molecular weight of 12,400 (calculated by hydroxide value).

The polyether and 1.1 equivalent weight of acrylic acid to the hydroxide number of the polyether were added to benzene the used amount of which is identical with that of the acrylic acid. The mixture was reacted by adding 0.01 mol % of sulfuric acid at a temperature of 80 to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-acrylated polyether having an average molecular weight of 12,560 and a structure of the formula ①, in which Z: 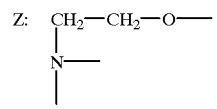

Y: $-OCCH=CH_2$ m: 10 n: 40 p: 2

R: 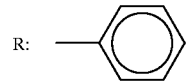

k: 3, was confirmed by measuring the bromine value and the saponification value.

To 3.6 g of thus obtained terminal-acrylated polyether, 15 g of dimethoxyethane, 2 g of lithium perchlorate and 0.04 g of 1-hydroxycyclohexyl phenyl ketone (polymerization initiator) were added and homogeneously dissolved. The obtained solution was flowed and spread on a glass plate, and irradiated with ultraviolet ray of 7 mW/cm² for 2 minutes under an atmosphere of nitrogen gas to obtain an ion-conductive polymer electrolyte having a thickness of 100 μm.

EXAMPLE 5

A mixture of 20 g of bisphenol A, 650 g of methyldodecaethylene glycol glycidyl ether represented by the following formula

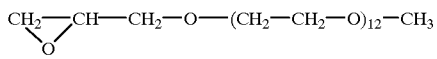

and 240 g of ethylene oxide was reacted in the presence of 4.2 g of potassium hydroxide as a catalyst, and then the product was purified with desalting to obtain 850 g of a polyether having an average molecular weight of 10,250 (calculated by hydroxide value).

The polyether and 1.1 equivalent weight of p-vinyl benzoic acid to the hydroxide number of the polyether were added to benzene the used amount of which is identical with that of the p-vinyl benzoic acid. The mixture was reacted by adding 0.01 mol % of sulfuric acid at a temperature of 80 to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-p-vinyl benzoated polyether having an average molecular weight of 10,510 and a structure of the formula ①, in which Z: 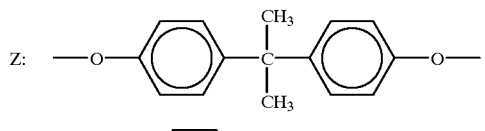

Y: 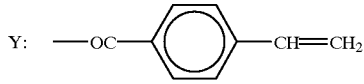

m: 6 n: 30 p: 12

R: —CH$_3$ k: 2, was confirmed by measuring the bromine value and the saponification value.

To 3.6 g of thus obtained terminal-p-vinyl benzoated polyether, 10 g of propylene carbonate, 3 g of 1,2-dimethoxyethane and 2.5 g of lithium trifluoromethanesulfonate were added and dissolved. The obtained solution was flowed and spread on a glass plate, and irradiated with an electron beam by using an electro-curtain type electron beam irradiating apparatus (200 kV, 5 Mrad) to obtain an ion-conductive polymer electrolyte having a thickness of 120 μm.

EXAMPLE 6

A mixture of 20 g of ethylenediamine, 5,520 g of phenylhexaethylene glycol glycidyl ether represented by the following formula

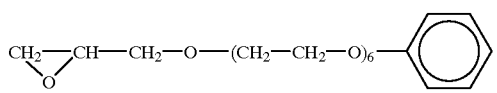

and 1,173 g of ethylene oxide was reacted in the presence of 9.4 g of potassium hydroxide as a catalyst, and then the product was purified with desalting to obtain 6,590 g of a polyether having an average molecular weight of 19,920 (calculated by hydroxide value).

The polyether and 1.1 equivalent weight of acrylic acid to the hydroxide number of the polyether were added to benzene the used amount of which is identical with that of the acrylic acid. The mixture was reacted by adding 0.01 mol % of sulfuric acid at a temperature of 80 to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-acrylated polyether having an average molecular weight of 20,136 and a structure of the formula ①, in which Z: 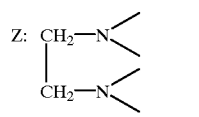

Y: 

m: 10 n: 20 p: 6

R: 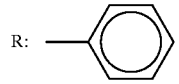

k: 4, was confirmed by measuring the bromine value and the saponification value.

To 3.6 g of thus obtained terminal-acrylated polyether, 3.6 g of propylene carbonate, 0.4 g of lithium perchlorate and 0.04 g of 1-hydroxycyclohexyl phenyl ketone (polymerization initiator) were added and homogeneously dissolved. The obtained solution was flowed and spread on a glass plate, and irradiated with ultraviolet ray of 7 mW/cm$^2$ for 2 minutes under an atmosphere of nitrogen gas to obtain an ion-conductive polymer electrolyte having a thickness of 100 μm.

EXAMPLE 7

A mixture of 30 g of ethylene glycol, 15,300 g of n-butyltriethylene glycol glycidyl ether represented by the following formula

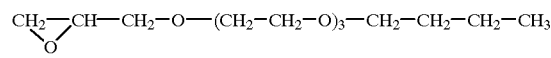

and 430 g of ethylene oxide was reacted in the presence of 6.8 g of potassium hydroxide as a catalyst, and then the product was purified with desalting to obtain 15,100 g of a polyether having an average molecular weight of 32,010 (calculated by hydroxide value).

The polyether and 1.1 equivalent weight of p-vinyl benzoic acid to the hydroxide number of the polyether were added to benzene the used amount of which is identical with that of the p-vinyl benzoic acid. The mixture was reacted by adding 0.01 mol % of sulfuric acid at a temperature of 80 to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-p-vinyl benzoated polyether having an average molecular weight of 32,270 and a structure of the formula ①, in which

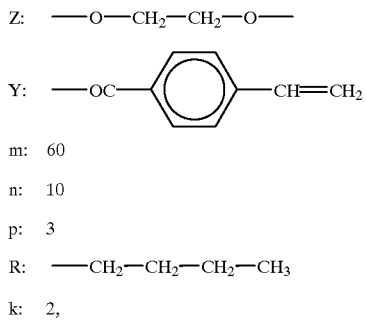

was confirmed by measuring the bromine value and the saponification value.

To 3.6 g of thus obtained terminal-p-vinyl benzoated polyether, 10 g of propylene carbonate, 3 g of 1,2-dimethoxyethane and 2.5 g of lithium trifluoromethane sulfonate were added and homogeneously dissolved. The obtained solution was flowed and spread on a glass plate, and irradiated with an electron beam by using an electro-curtain type electron beam irradiating apparatus (200 kV, 5 Mrad) to obtain an ion-conductive polymer electrolyte having a thickness of 120 μm.

EXAMPLE 8

A mixture of 30 g of pentaethylenehexamine, 480 g of methyltriethylene glycol glycidyl ether represented by the following formula

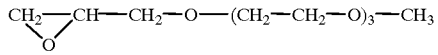

and 460 g of ethylene oxide was reacted in the presence of 6.9 g of potassium hydroxide as a catalyst, and then the product was purified with desalting to obtain 850 g of a polyether having an average molecular weight of 7,250 (calculated by hydroxide value).

Thus obtained polyether was the compound having a structure represented by the general formula ①, in which

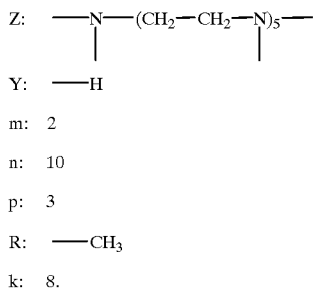

3.6 g of thus obtained polyether, 1.5 equivalent weight of hexamethylenediisocyanate to the mole number of the polyether and 0.01 g of dibutyltin dilaurate were dissolved in 3 ml of methyl ethyl ketone and then the mixture was poured into a flat vessel. Then the solution was allowed to stand for 30 minutes at 60° C. in a stream of nitrogen gas under atmospheric pressure. Then the solution was heat-treated for 8 hours at 80° C. in vacuum degree of below $1 \times 10^{-3}$ Torr to remove methyl ethyl ketone, and then thus obtained film was impregnated with a solution of lithium perchlorate (2 g) dissolved in propylene carbonate (10 g) under an atmosphere of nitrogen gas, and resultantly an ion-conductive polymer electrolyte having a thickness of 50 μm was obtained.

EXAMPLE 9

A mixture of 20 g of ethylene glycol, 3,450 g of methyl glycidyl ether represented by the following formula

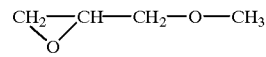

and 550 g of ethylene oxide was reacted in the presence of 50 g of potassium hydroxide as a catalyst, and then the product was purified with desalting to obtain 3,890 g of a polyether having an average molecular weight of 12,310 (calculated by hydroxide value).

The polyether and 1.1 equivalent weight of acrylic acid to the hydroxide number of the polyether were added to benzene the used amount of which is identical with that of the acrylic acid. The mixture was reacted by adding 0.01 mol % of sulfuric acid at a temperature of 80 to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-acrylated polyether having an average molecular weight of 12,417 and a structure of the formula ①, in which

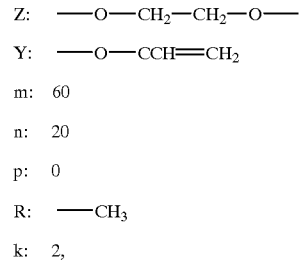

was confirmed by measuring the bromine value and the saponification value.

To 3.6 g of thus obtained terminal-acrylated polyether, 3.6 g of γ-butyrolactone, 0.4 g of lithium perchlorate and 0.04 g of 1-hydroxycyclohexyl phenyl ketone (polymerization initiator) were added and homogeneously dissolved. The obtained solution was flowed and spread on a glass plate, and irradiated with ultraviolet ray of 7 mW/cm² for 2 minutes under an atmosphere of nitrogen gas to obtain an ion-conductive polymer electrolyte having a thickness of 100 μm.

COMPARATIVE EXAMPLE

An ion-conductive polymer electrolyte was obtained in the same manner as described in Example 1 except that the terminal-acrylated polyether was produced with use of a random polyether comprising ethylene oxide and propylene oxide units (molar ratio 8:2) and having an average molecular weight of 3,000 instead of a polyether having an average molecular weight of 4,700.

(Lithium-ion conductivity test)

Each of the ion-conductive polymer electrolytes obtained in Examples 1 to 9 and Comparative Example was interposed between platinum electrodes and the alternating current impedance between electrodes was measured and the complex impedance was analyzed. The results are shown in following Table 1.

TABLE 1

|  |  | Ionic conductivity (S/cm) | | |
| --- | --- | --- | --- | --- |
|  |  | 20° C. | 0° C. | −20° C. |
| Example | 1 | $9.2 \times 10^{-4}$ | $5.1 \times 10^{-4}$ | $2.5 \times 10^{-4}$ |
|  | 2 | $8.9 \times 10^{-4}$ | $4.8 \times 10^{-4}$ | $2.2 \times 10^{-4}$ |
|  | 3 | $9.9 \times 10^{-4}$ | $5.6 \times 10^{-4}$ | $2.7 \times 10^{-4}$ |
|  | 4 | $8.8 \times 10^{-4}$ | $4.6 \times 10^{-4}$ | $2.1 \times 10^{-4}$ |
|  | 5 | $5.9 \times 10^{-4}$ | $2.8 \times 10^{-4}$ | $1.0 \times 10^{-4}$ |
|  | 6 | $1.0 \times 10^{-3}$ | $6.2 \times 10^{-4}$ | $4.1 \times 10^{-4}$ |
|  | 7 | $9.7 \times 10^{-4}$ | $5.9 \times 10^{-4}$ | $2.8 \times 10^{-4}$ |
|  | 8 | $9.5 \times 10^{-4}$ | $5.6 \times 10^{-4}$ | $2.7 \times 10^{-4}$ |
|  | 9 | $1.1 \times 10^{-3}$ | $6.3 \times 10^{-4}$ | $4.0 \times 10^{-4}$ |
| Comparative Example |  | $2.5 \times 10^{-4}$ | $1.5 \times 10^{-5}$ | $1.9 \times 10^{-6}$ |

As shown in Table 1, it is found that the ion-conductive polymer electrolyte according to the present invention shows good ionic conductivity, and the superiority of the ionic conductivity becomes greater as the temperature is lowered.

The ion-conductive polymer electrolyte according to the present invention shows good ionic conductivity stability. Further, the ion-conductive polymer electrolyte can be converted into the products having various forms and is very excellent in practicality, since it can be made amorphous. Furthermore, the ion-conductive polymer electrolyte according to the present invention is excellent in safety and available with simple operation, since it can be crosslinked without using a crosslinking agent.

What is claimed is:

1. An ion-conductive polymer electrolyte comprising an organic polymer, a soluble electrolyte salt and an organic solvent, characterized in that said organic polymer is obtained by crosslinking an organic compound having an average molecular weight of 500 to 50,000 and a structure of the following general formula ①,

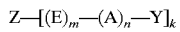

Z—[(E)$_m$—(A)$_n$—Y]$_k$                         ① in which Z is a residue of a compound having at least one active hydrogen; Y is an active hydrogen group or polymerizable functional group; k is an integer of 1 to 12; E is a structure of the following general Formula ②,

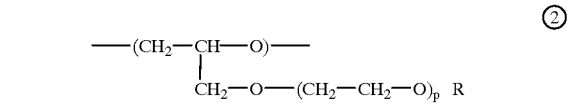

wherein p is an integer of 0 to 25 and R is an alkyl, alkenyl, aryl or alkylaryl group having 1 to 20 carbon atoms; A is —(CH$_2$—CH$_2$—O)—; m is an integer of 1 to 220; n is an integer of 1 to 240 and m+n≧4; and E and A are random-copolymerized, and said organic solvent is at least one selected from the group consisting of tetrahydrofuran, 2-methyltetrahydrofuran, 1,3-dioxolan, 4,4-dimethyl-1,3-dioxolan, γ-butyrolactone, ethylene carbonate, propylene carbonate, butylene carbonate, sulfolan, 3-methylsulfone, tert-butyl ether, iso-butyl ether, 1,2-dimethoxyethane, 1,2-ethoxymethoxyethane and ethylene glycol diethyl ether.

2. An ion-conductive polymer electrolyte as defined in claim 1, wherein Y of said formula ① is an active hydrogen group and said organic polymer is obtained by crosslinking said organic compound with a crosslinking agent.

3. An ion-conductive polymer electrolyte as defined in claim 1, wherein Y of said formula ① is a polymerizable functional group and said organic polymer is a compound obtained by polymerizing said organic compound.

4. An ion-conductive polymer electrolyte as defined in claim 1, wherein said soluble electrolyte salt is at least one selected from the group consisting of inorganic-ion salts containing at least one metal element selected from the group consisting of Li, Na, K, Cs, Ag, Cu and Mg, (CH$_3$)$_4$NBF$_4$, (CH$_3$)$_4$NBr, (C$_2$H$_5$)$_4$NClO$_4$, (C$_2$H$_5$)$_4$NI, (C$_3$H$_7$)$_4$NBr, (n-C$_4$H$_9$)$_4$NClO$_4$, (n-C$_4$H$_9$)$_4$NI, (n-C$_5$H$_{11}$)$_4$NI, lithium stearylsulfonate, sodium octylsulfonate, lithium dodecylbenzenesulfonate, sodium naphthalenesulfonate, lithium dibutylnaphthalenesulfonate, potassium octylnaphthalenesulfonate, and potassium dodecylnaphthalenesulfonate.

5. An ion-conductive polymer electrolyte as defined in claim 1, wherein said organic solvent is used in an amount of 100–900% by weight based on the amount of said organic polymer.

6. An ion-conductive polymer electrolyte as defined in claim 1, wherein said soluble electrolyte salt is used in an amount of at least 0.5% by weight based on the amount of said organic solvent but less than the solubility of said soluble electrolyte salt in said organic solvent.

* * * * *